US006771775B1

(12) United States Patent
Widmer

(10) Patent No.: US 6,771,775 B1
(45) Date of Patent: Aug. 3, 2004

(54) ARRANGEMENT FOR COMMUNICATING MESSAGES VIA A LOW-VOLTAGE ELECTRICITY SUPPLY SYSTEM AND ADAPTER

(75) Inventor: Hanspeter Widmer, Melligen (CH)

(73) Assignee: Ascom Powerline Communications AG, Bern (CH)

( * ) Notice: Subject to any disclaimer, the term of this patent is extended or adjusted under 35 U.S.C. 154(b) by 0 days.

(21) Appl. No.: 09/762,316

(22) PCT Filed: Jul. 14, 1999

(86) PCT No.: PCT/CH99/00322

§ 371 (c)(1),
(2), (4) Date: Feb. 6, 2001

(87) PCT Pub. No.: WO00/11759

PCT Pub. Date: Mar. 2, 2000

(30) Foreign Application Priority Data

Aug. 17, 1998 (EP) ............................................ 98810785

(51) Int. Cl.[7] ......................... H04M 11/00; H04M 1/00; H04M 9/00; H01R 25/00
(52) U.S. Cl. .............................. 379/413.04; 379/93.05; 379/93.11; 379/387.01; 379/399.01; 439/499; 439/620; 439/655
(58) Field of Search ........................ 379/90.01, 93.01, 379/93.05, 93.06, 93.08, 93.11, 399.01, 387.01, 412, 413.02, 413.04; 439/105, 651, 652, 655, 499, 620

(56) References Cited

U.S. PATENT DOCUMENTS

| 5,115,368 A | | 5/1992 | Smith ........................... 361/56 |
| 5,181,000 A | * | 1/1993 | Smith ........................... 333/181 |
| 5,217,394 A | * | 6/1993 | Ho ............................... 439/620 |
| 5,283,572 A | * | 2/1994 | McClelland et al. .... 340/870.02 |
| 5,513,998 A | * | 5/1996 | Kim ............................. 439/170 |
| 5,919,060 A | * | 7/1999 | Lee ............................. 439/518 |
| 6,037,678 A | * | 3/2000 | Rickard ........................ 307/89 |
| 6,273,750 B1 | * | 8/2001 | Malkowski, Jr. ............ 439/499 |
| 6,398,589 B1 | * | 6/2002 | Congelliere ................. 439/655 |
| 6,507,573 B1 | * | 1/2003 | Brandt et al. ................ 370/335 |

FOREIGN PATENT DOCUMENTS

| DE | A1-3148351 | 7/1982 | ........... H01R/13/66 |
| EP | A2141673 | 5/1985 | ........... H04B/3/56 |
| WO | WO 95/29537 | * 11/1995 | ........... H04B/3/54 |

* cited by examiner

Primary Examiner—Binh Tieu
(74) Attorney, Agent, or Firm—Birch, Stewart, Kolasch & Birch, LLP

(57) ABSTRACT

A PC (10) connected to a low-voltage electricity supply system (9) via a mains plug (11) and a mains socket outlet (12), into which the said plug is plugged, exchanges messages with other apparatuses via the said electricity supply system by means of signals whose frequency is between 1 MHz and 40 MHz. In order to suppress high-frequency interference signals which are generated by further apparatuses which are connected to the low-voltage electricity supply system (9) via mains plugs (11') and further mains socket outlets (12'), arranged in local proximity to the said mains socket outlet (12), or which are produced by reflections of signals at open line ends, an adapter (1) is in each case interposed there, which adapter is plugged into the mains socket outlet (12') and into which adapter the mains plug (11') of the respective apparatus is plugged. The adapter (1) connects each pin of the mains plug (11') to a socket of the mains socket outlet (12'), inductor coils which block signals in the frequency range of the message transmission being situated, however, in the phase conductor and in the neutral conductor of the adapter (1).

10 Claims, 2 Drawing Sheets

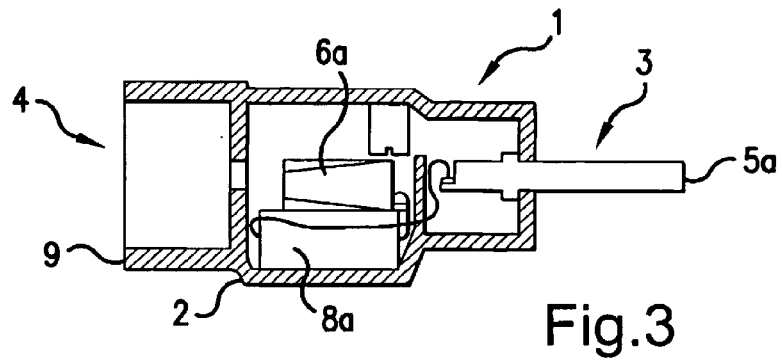
Fig.3
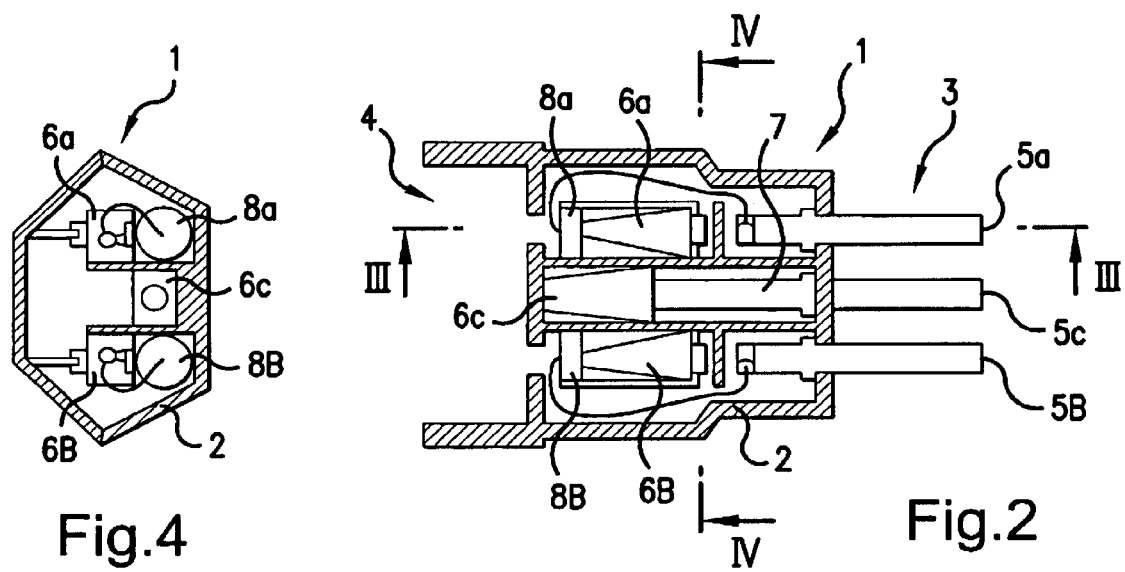
Fig.4
Fig.2
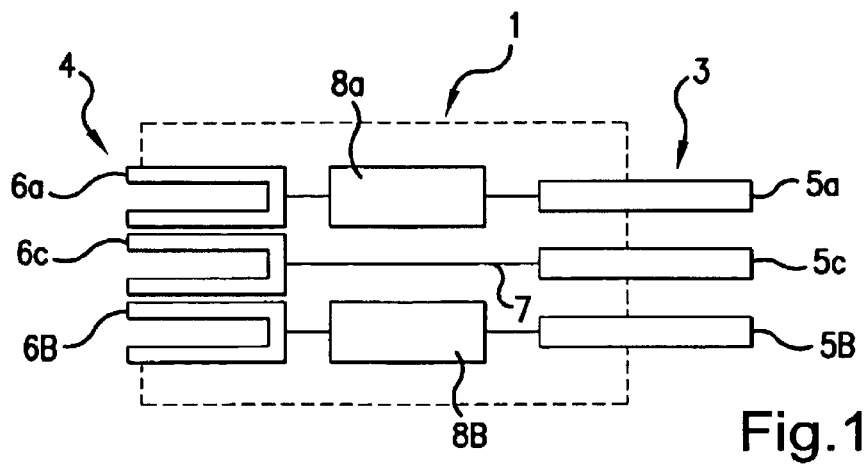
Fig.1

ARRANGEMENT FOR COMMUNICATING MESSAGES VIA A LOW-VOLTAGE ELECTRICITY SUPPLY SYSTEM AND ADAPTER

This application is the national phase under 35 U.S.C. § 371 of PCT International Application No. PCT/CH99/00322 which has an International filing date of Jul. 14, 1999, which designated the United States of America.

TECHNICAL FIELD

The invention relates to an arrangement for communicating messages via a low-voltage electricity supply system in accordance with the preamble of Claim 1, and also to an adapter for use in the said arrangement.

PRIOR ART

It is known for messages such as telephone calls, faxes, digital data, etc., also to be transmitted via low-voltage electricity supply systems. For this purpose, the messages are coded and impressed on a high-frequency carrier signal in a known manner, e.g. by frequency modulation. The modulated carrier signal is coupled into the low-voltage electricity supply system by the respective transmitter and is coupled out again in the same way by the respective receiver and decoded. Message transmission systems which use an electricity supply system in this way are described e.g. in WO-A-95/19 537.

However, high-frequency interference can arise in low-voltage electricity supply systems as a result of various processes, which interference is superposed on the carrier signal, is concomitantly coupled out and, under certain circumstances, appreciably impairs the quality of the message transmission. This makes it necessary to repeat communications, which entails a reduction in the data rate. Suppressing such interference at the receiver is often possible only with a considerable outlay on circuitry, or is not possible at all.

The strongest interference signals often originate from the local proximity of apparatuses participating in the message exchange. In particular, all kinds of apparatuses connected to the mains often generate interference signals with a pronounced high-frequency component e.g. during switching processes, which signals, if they pass into the mains in the vicinity of an apparatus connected for reception, reach the said mains with almost no attenuation and appreciably interfere with the message reception.

In addition, reflections often occur at open line terminations. It frequently turns out that the length of a cable between plug and apparatus constitutes precisely a quarter of the wavelength of the carrier signal or an odd-numbered multiple thereof. This leads, irrespective of whether or not the apparatus is switched on, to particularly pronounced reflections which are superposed on the carrier signal. Many instances of interference which greatly impair the quality of the message transmission pass into the electricity supply system in this way, especially in office buildings containing numerous connected apparatuses.

In order to protect connected apparatuses, mains filters integrated in mains plugs are known, with inductances in phase conductor and neutral conductor and capacitive coupling of the same to the earth conductor connected to a cable screen (see e.g. U.S. Pat. No. 4,614,924), the capacitances considerably increasing the volume of the plug, in particular its length and also the costs. U.S. Pat. No. 5,266,055 also discloses a three-pole mains plug in which only inductances are used. In both cases, the inductances serve only for protecting the connected apparatus against high-frequency interference signals. For this reason, the plug is also fixedly connected to the apparatus in each case. The last-mentioned document also shows connecting parts which serve for suppressing interference within an apparatus. Both in the case of the mains plug and in the case of the connecting part, a short conductor—a straight conductor piece or a half-loop—is embedded in ferrite material in each case. However, only small inductances can be realized in this way, and they only suppress signals of very high frequency.

SUMMARY OF THE INVENTION

The invention is based on the object of specifying an arrangement of the generic type which is significantly improved compared with known arrangements of the generic type in respect of its suitability for transmitting messages, and also an adapter suitable for use in the arrangement according to the invention.

By virtue of the invention's arrangement for communicating messages via the low-voltage electricity supply system, the latter is better adjusted to transmitting messages. Interference of the aforementioned type is intercepted or suppressed at source and kept away from the mains. Thus, in particular, the reception of messages is not impaired by virtually unattenuated interference from the local proximity. This applies particularly when the frequencies utilized for the data communication are comparatively high. The interfering effect of cable sections situated between plugs and apparatuses is also suppressed and a line termination which is favourable for the transmission response of the low-voltage electricity supply system is produced in each case.

The suppression of interference also means that more capacity is available for the communication of messages, since the total permissible interference level—which must also include the carrier signal—is usually limited by legal provisions. This favourable effect is additionally enhanced by the fact that in the case of a low interference level, a weaker carrier signal also suffices.

The adapter according to the invention affords a particularly simple and highly cost-effective possibility for realizing the arrangement according to the invention. It can be constructed very compactly, in particular it can be short, and can be fitted easily and rapidly as required and can likewise easily be removed again as well, with the result that the electricity supply system can largely be kept free of interference. The use of inductor coils saves space and avoids saturation effects.

BRIEF DESCRIPTION OF THE DRAWINGS

The invention is explained in more detail below with reference to drawings which merely illustrate an exemplary embodiment. In the figures, FIG. 1 shows a diagrammatic illustration of the adapter according to the invention, FIG. 2 shows a horizontal longitudinal section through the adapter according to the invention, FIG. 3 shows a section along III—III in FIG. 2, FIG. 4 shows a section along IV—IV in FIG. 2.

WAYS OF EMBODYING THE INVENTION

Figure 5:
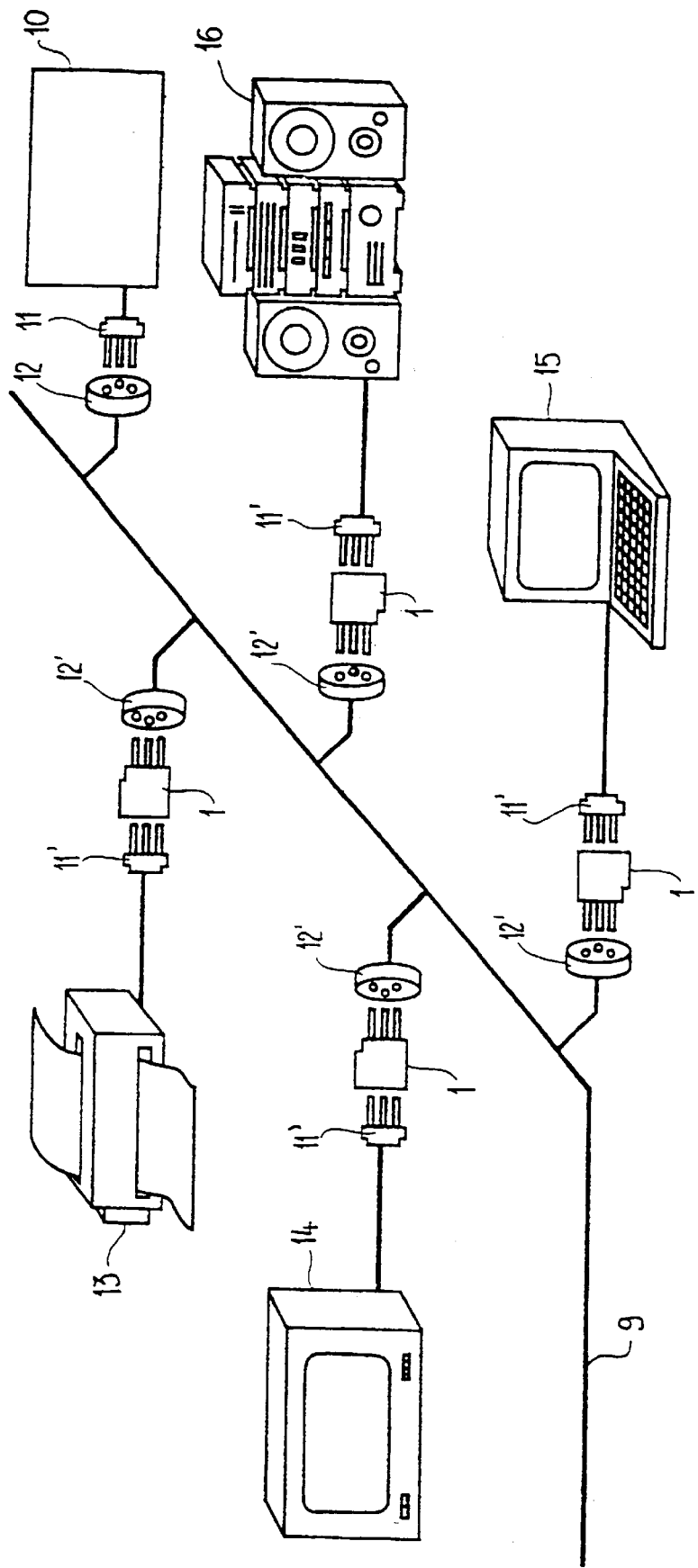
FIG. 5 shows a diagrammatic illustration of an arrangement, according to the invention, for communicating messages.

The adapter 1 according to the invention has, in a rigid, coherent housing 2 made of plastic, a plug 3 and, on the opposite housing wall, a socket outlet 4 directed towards the opposite side. The plug 3 comprises three parallel pins 5a, b, c, of which the pins 5a, b lie in one plane, while the pin 5c is arranged between the two pins 5a, b in a slightly offset manner with respect to this plane. The plug 3 is suitable for plugging into a standard-conforming mains socket outlet.

The socket outlet 4 comprises three sockets 6a, b, c, arranged inside the housing 2 in a configuration corresponding to the arrangement of the pins 5a, b, c and is thus compatible with the plug 3 and is suitable for receiving a standard-conforming mains plug corresponding thereto. The pin 5c is designed in one piece with the socket 6c and a straight connecting piece 7 arranged between the two. Consequently, the pin 5c is electrically conductively connected to the socket 6c not via an inductance but directly, for safety reasons—the pin 5c, the connection 7 and the socket 6c form an earth conductor connection, with the result that the impedance of the connection is negligibly small.

By contrast, the pin 5a is electrically conductively connected to the socket 6a via an inductor coil 8a, which is arranged underneath the socket 6a and next to the socket 6c in the housing 2. The pin 5b is connected to the socket 6b via an inductor coil 8b in the same way. The arrangement described is particularly space-saving. The pins 5a and 5b form a phase conductor and neutral conductor connection, respectively, with the inductor coil 8a and 8b, respectively, and the socket 6a and 6b, respectively. The inductor coils 8a, b each have an inductance of preferably at least 10 $\mu$H, with the result that they greatly attenuate the signals whose frequency is substantially greater than the mains frequency of approximately 50 Hz, in particular greater than 1 MHz.

By dint of the restriction to inductor coils—capacitances are dispensed with—the adapter can not only be produced inexpensively but can also be constructed very compactly. In particular, it is possible to avoid a long structural length, which, owing to the relatively large lever of forces that possibly act, would greatly increase the risk of the adapter breaking away or else of mains socket outlets being damaged or torn out.

In an arrangement for communicating messages which may be telephone calls, faxes, digital data, any desired audio or video signals, inter alia—via a low-voltage electricity supply system 9 (FIG. 5), which is preferably situated within a public or private building or building complex, an apparatus participating in the exchange of messages, e.g. a PC 10, is directly connected to said mains by its mains plug 11 being plugged into a mains socket outlet 12 thereof. Via this connection, the PC 10 is on the one hand supplied with power and, on the other hand, it exchanges messages with other apparatuses (not illustrated), which are likewise connected to the low-voltage electricity supply system 9, via the said connection and the said low-voltage electricity supply system. In this case, a carrier frequency which is far greater than the mains frequency is used, the said carrier frequency preferably being between 1 MHz and 40 MHz, preferably at least 10 MHz.

Further apparatuses connected to the low-voltage electricity supply system 9 via mains socket outlets 12' and mains plugs 11' in local proximity to the mains socket outlet 12, to which the PC 10 is connected, the said apparatuses not participating in the message exchange, such as a printer 13, a television set 14, a terminal 15 and a stereo system 16, may generate interference signals with high-frequency components, e.g. during switching processes. If the said interference signals reach the PC 10, to which the said apparatuses are connected via short lines associated with the low-voltage electricity supply system 9, essentially with no attenuation, they could be suppressed there only with very complicated measures in terms of circuitry, or even not at all, and appreciably interfere with the reception of messages, on which they are superposed.

For this reason, the apparatuses which are considered as sources of interference signals are connected to the low-voltage electricity supply system 9 via an adapter 1 in each case. It is preferable here for the plug 3 of the adapter 1 in each case to be plugged directly into the corresponding mains socket outlet 12', while its socket outlet 4 receives the mains plug 11' of the apparatus. If extension cables or distributors are used, the adapter can also be arranged at a different location. In every case, high-frequency signals emerging from the said apparatuses, in particular those signals which lie in the aforementioned range between 1 MHz and 40 MHz which is preferred for the exchange of messages, are practically completely suppressed by the inductor coils 8a, b of the adapter 1, with the result that they do not interfere with the reception of messages at the PC 10.

The adapter 1 additionally has the effect of practically decoupling the cable between the plug and the respective apparatus for signals of relatively high frequency, which cable constitutes an open line termination above all in the case of an unfavourable length and can cause appreciable interference even when the apparatus is switched off. As a result, reflections are suppressed and the sum of the interference signals on the low-voltage electricity supply system 9 is reduced further, very substantially so under certain circumstances.

The reduction of interference enables the data transmission rates to be considerably increased. Moreover, the intensity of the carrier signal can be reduced, thereby making it substantially easier to comply with legal limitations for the total level of high-frequency signals on the low-voltage electricity supply system 9.

Various modifications of the adapter are possible within the scope of the invention. Thus, by way of example, it may be designed as a distributor with a plurality of socket outlets, the mutually corresponding sockets of the phase conductor and of the neutral conductor preferably being connected to a single inductor coil connected downstream of the corresponding pin. It may also be designed as an extension cable, the plug, on the one hand, and the socket outlet or else a plurality of socket outlets, on the other hand, being arranged in two housing parts which are connected by a three-core cable. The inductor coils are then accommodated in one of the two housing parts or distributed between the two. The one-part embodiment portrayed is preferred, however, owing to its particularly compact structure and to the fact that it is simple and clear to use—particularly if the adapter is plugged directly into the mains socket outlet in each case.

Of course, the invention can also be used analogously in low-voltage electricity supply systems conforming to other standards, e.g. with three phase conductors.

What is claimed is:

1. Arrangement for communicating messages via a low-voltage electricity supply system (9) having at least one phase conductor, a neutral conductor and an earth conductor, comprising at least one apparatus which is suitable at least for receiving or for emitting a carrier signal for the transmission of data, the frequency of which carrier signal is substantially greater than the mains frequency, and is connected to the low-voltage electricity supply system (9) via a plug that is plugged into a mains socket outlet (12), and at least one apparatus which does not participate in the exchange of data, constitutes a possible source of interference and is connected to the low-voltage electricity supply system (9) via a mains plug (11') and a mains socket outlet (12'), which is electrically conductively connected to the latter, characterized in that the connection between the mains plug (11') of the at least one apparatus constituting a possible source of interference and the mains socket outlet (12') is established via an adapter (1) having a plug (3), which is connected to the mains socket outlet (12') and, in particular, is plugged into the latter, and at least one socket outlet (4), to which the apparatus is connected via a plug which is plugged into the said socket outlet, which adapter (1) has parallel conductor connections for the individual conductors of the low-voltage electricity supply system (9), and inductance being situated in each of the conductor connections with the exception of the earth conductor connection.

2. Arrangement according to claim 1, characterized in that it is situated within a building or building complex.

3. Arrangement according to claim 1 or 2, characterized in that the frequency of the signal for the transmission of data is between 1 MHz and 40 MHz.

4. Arrangement according to claim 1, characterized in that the value of the inductance is in each case between 10 $\mu$H and 20 $\mu$H.

5. Adapter (1) for use in an arrangement according to claim 1, having, in a housing (2), a plug (3) having at least three switching pins (5a, 5b, 5c) for plugging into a mains socket outlet (12'), having at least one socket outlet (4) having sockets (6a, 6b, 6c) for receiving a mains plug (11'), the said socket outlet being arranged such that it is remote from the plug (3) and being compatible with the latter, each switching pin (5a; 5b; 5c) being electrically conductively connected to a socket (6a; 6b; 6c), characterized in that, except for in the case of a pin (5c) and a socket (6c), which are connected by a direct connection (7), an inductor coil (8a; 8b) is in each case situated between the pin (5a; 5b) and the socket (6a; 6b).

6. Adapter according to claim 5, characterized in that the connection (7) between the pin (5c) and the socket (6c) is designed in one piece with the same.

7. Adapter according to claim 5 or 6, characterized in that it has precisely one socket outlet (4).

8. Adapter according to claim 5, characterized in that the housing (2) is designed to be coherent and rigid.

9. Adapter according to claims 7 and 8, characterized in that it has in each case precisely three pins (5a, 5b, 5c) and three sockets (6a, 6b, 6c), and the pins (5a, 5b) and sockets (6a, 6b) connected to the inductor coils (8a, 8b) are arranged such that they are in each case spaced apart from one another in one plane, and the remaining socket (6c) is fitted between them in an offset manner with respect to the said plane, while the inductor coils (8a, 8b) are in each case situated under the sockets (6a, 6b), connected to them, on both sides next to the remaining socket (6b).

10. Adapter according to one of claims 5 to 9, characterized in that the housing (2) is composed of plastic.

* * * * *